United States Patent
Dressler et al.

(10) Patent No.: US 9,678,867 B2
(45) Date of Patent: Jun. 13, 2017

(54) METHOD FOR CHANGING THE SOFTWARE IN THE MEMORY OF AN ELECTRONIC CONTROL UNIT

(71) Applicant: dSPACE digital signal processing and control engineering GmbH, Paderborn (DE)

(72) Inventors: Marc Dressler, Horn-Bad Meinberg (DE); Thorsten Hufnagel, Salzkotten (DE); Bastian Kellers, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 265 days.

(21) Appl. No.: 14/564,958

(22) Filed: Dec. 9, 2014

(65) Prior Publication Data

US 2015/0161046 A1 Jun. 11, 2015

(30) Foreign Application Priority Data

Dec. 9, 2013 (EP) .................................. 13005730

(51) Int. Cl.
*G06F 9/445* (2006.01)
*G06F 12/06* (2006.01)
*G06F 13/24* (2006.01)

(52) U.S. Cl.
CPC ............ *G06F 12/0638* (2013.01); *G06F 8/65* (2013.01); *G06F 8/66* (2013.01); *G06F 13/24* (2013.01); *G06F 2212/202* (2013.01)

(58) Field of Classification Search
CPC .......... G06F 8/65; G06F 12/0638; G06F 8/66; G06F 2212/202; G06F 13/24

USPC ............................. 710/48; 711/102; 717/168
See application file for complete search history.

(56) References Cited

U.S. PATENT DOCUMENTS

| | | | | |
|---|---|---|---|---|
| 8,561,054 B2* | 10/2013 | Smirnov | ................... | G06F 8/64 717/120 |
| 8,949,823 B2* | 2/2015 | Ricci | ....................... | G06F 13/14 717/168 |
| 2006/0242383 A1 | 10/2006 | Chen et al. | | |
| 2014/0143770 A1* | 5/2014 | Oberai | ..................... | G06F 8/61 717/174 |
| 2016/0232191 A1* | 8/2016 | Adrian | ................... | H04N 1/387 |

OTHER PUBLICATIONS

Levine J: "Linkers and Loaders—Loading and Overlays" Jun. 15, 1999 (Jun. 15, 1999), XP002368385.

* cited by examiner

*Primary Examiner* — John Chavis
(74) *Attorney, Agent, or Firm* — Muncy, Geissler, Olds & Lowe, P.C.

(57) ABSTRACT

A method for changing software in a memory of an electronic control unit, wherein each memory address from the overlay memory can be assigned to a memory address in the read-only memory by an assignment information item. During a run time of the control unit, at least a functional part of a bypass routine that is to at least partially replace an original program routine is stored in an address range in the overlay memory, or a jump instruction is stored in the overlay memory as the first part of a bypass routine that refers to a second part of the bypass routine that is stored in an address range accessible to the processor. To activate an overlay functionality the address and/or the address range of the overlay memory are assigned to an address or address range of the program routine to be replaced.

20 Claims, 8 Drawing Sheets

METHOD FOR CHANGING THE SOFTWARE IN THE MEMORY OF AN ELECTRONIC CONTROL UNIT

This nonprovisional application claims priority to European Patent Application No. EP13005730.0, which was filed on Dec. 9, 2013, and which is herein incorporated by reference.

BACKGROUND OF THE INVENTION

Field of the Invention

The present invention relates to a method for changing the software in the memory of an electronic control unit, wherein the memory includes at least one read-only memory with multiple original program routines stored therein that constitute at least a portion of the software and that are processed by at least one processor of the control unit, the memory has at least one working memory for storing volatile data, and the memory also has an overlay memory, from which each memory address can be assigned to a memory address in the read-only memory by an assignment information item, with the result that, when an overlay functionality is activated, instead of processing a program routine instruction at an address in the read-only memory, the processor processes the instruction at an assigned address of the overlay memory.

Description of the Background Art

In the automotive industry, the use of software control and regulation mechanisms allows for a degree of efficiency that could not be accomplished using purely mechanical solutions. Modern automobiles contain a network of electronic control units (ECUs) that each have at least a processor that processes program routines, a working memory, and a read-only memory, the latter of which is usually implemented in the form of a flash memory.

All control units additionally have interfaces by means of which they receive sensor data, operate actuators, and communicate with one another. In keeping with general practice in the software industry, use of existing solutions is popular in ECU programming as well. An already existing control unit, for example an engine control unit for an engine from a previous model, then serves as the basis for development of a new control unit. Individual program routines are then selectively modified or developed from scratch, while the majority of the old code is preserved.

Alternatively, manufacturers often contract with suppliers for fully programmed development control units, and then modify them in accordance with their own specific requirements. In this scenario, the newly developed program routines must be integrated into the executable binary code of the control unit, where they replace, change, or supplement the original program routine in question. This integration process is referred to as bypassing.

Various possibilities exist for implementing a bypass. One very common method is service-based bypassing. A service is a special function located in the control unit's memory. It is called at specific points in the program code, and takes over technical performance of the bypass in that it calls the bypass routine, either in addition to or in place of the original program routine, makes the bypass routine's input quantities available, and ensures that values written by the bypass routine are stored at the correct locations in the control unit memory after the bypass routine has run. Other methods work without service functions. They are based on modification of the binary code. For example, it is possible to make variable accesses in a function inactive by inserting switch logic statements.

As a matter of principle, the code of a bypass routine can be located either on an external system or on the control unit itself. The latter possibility, so-called internal bypassing, needs less additional hardware and is not dependent on the presence of special interfaces.

According to the current conventional art, a development control unit needs to be prepared for execution of a bypass. When a service-based bypass method is used, this means that a call to the service function must be integrated into the binary code of a program routine before and/or after (depending on the method) and/or within the function that is to be replaced. In the ideal case, these service calls would already be implemented at the source code level. In practice, this cannot always be accomplished. For example, the supplier of the control unit may not be willing to do so, or the necessity of bypassing a specific function is not identified until after the control unit has already been completed. In such a case, it is also possible to integrate the calls into the binary code after the fact.

According to the current conventional art, installing the code of a bypass routine requires the flash memory of the control unit to be reloaded each time. This is not only time-consuming (from several tens of seconds to minutes) and interrupts ongoing test series, but it also stresses the flash memory, which is physically capable of withstanding only a limited number of storage operations.

In a typical scenario for service-based internal bypassing according to the conventional art, a special bypass service function is present in the flash in addition to the actual program code. A given program routine f that is prepared for a bypass is expanded by two calls to the service. The user who is installing a bypass routine in the flash enters its memory address in a table. The first call to the service function is located directly before f, for example. The service function receives a table position as an argument. If it finds a memory address there, it calls the bypass function that is located at this address. Otherwise, it remains passive. If it is executed, the bypass routine writes all values it produces into a buffer memory having global variables defined especially for it. After running the bypass routine, the processor jumps back to the actual program. The function f then runs normally, regardless of whether a bypass routine was executed or not.

The execution of f is followed by a second call to the service function. It receives a second table position as an argument, and finds the address of an overwrite function there. This function is matched to the bypass routine and was installed together with it. The overwrite routine reads the buffer memory created by the bypass routine and overwrites the variables written by f.

The information about the variables processed by f comes from the A2L file of the control unit. This is a technical description file that is provided with every development control unit. Among other things, it contains a block that associates the functions running on the control unit with the variables each one reads and writes, as well as a second block that lists the memory addresses of the variables. Knowledge of the source code of f thus is not necessary for creating a bypass routine.

SUMMARY OF THE INVENTION

It is therefore an object of the present invention to provide a change in software on a control unit that was not originally prepared to permit changes to the software, in particular was not originally so prepared by the manufacturer, and thus in particular need not include any prepared service function calls within the program routines.

In addition, it is an object of the invention to leave the content of the flash memory largely or even completely untouched in the process, thus avoiding a majority of the aforementioned problems that occur with bypassing (physical stressing of the flash memory, great deal of time spent on loading of the control unit, necessity of advance preparation using service functions). It is another object to open up the opportunity to dynamically supplement, change, or replace the code of a program routine at the run time of the control unit, in particular without stopping the control unit to do so.

This object is attained according to an embodiment of the invention in that at least a part of a bypass routine that is to supplement or at least partially replace an original program routine is stored in an address range in the overlay memory, either through an interface of the control unit by an influencing device connected to the interface or through a service code integrated into the control unit program, in particular during the run time of the control unit. According to the invention, a bypass routine includes functional code that directly affects the functionality of the control unit, and of optional auxiliary code that supplements the functional code as needed to ensure proper execution of the functional code. Some examples of auxiliary code are jump instructions, service functions, and calls of service functions.

Replacement of a program routine or at least a part thereof can be defined in accordance with an embodiment of the invention to mean that the program routine or a portion thereof is functionally replaced, which is to say that instead of processing this routine or portion, the processor runs a different routine or a different portion. The replacement according to the invention specifically does not, in accordance with the invention, change the original code in the read-only memory but instead leaves it untouched. It is ensured according to the invention that a different code instead of the original code is executed by the processor.

To this end, the invention makes use of the fact that control units, especially development control units, which are not intended to be installed in a product in mass production, but instead for the development, testing, and calibration of the software implemented on the unit, often have a so-called overlay memory. This is a specific memory area that is used for fast and uncomplicated overlaying of individual fragments of the program code.

This can be, for example, a separate memory module integrated into the processor, or a reserved or reservable area of the working or flash memory. Individual addresses or whole address ranges of the overlay memory can be assigned to addresses or address ranges of equal size on the flash or working memory by at least one assignment information item, which in particular is stored in processor registers provided for this purpose.

According to an embodiment of the invention, an assignment information item is created with a computer connected to the control unit or by software running on the computer and/or with an influencing device connected to the control unit, which information item is then written into the processor register provided for this purpose in order to activate the assignment and thus in order to activate the overlay functionality.

In a control unit of this type, for every processor access to a memory address, in particular a memory address of at least the read-only memory, a check is made as to whether this address is assigned to an address in the overlay memory.

If this is the case, the content of the memory address is ignored, and the assigned memory address in the overlay memory is accessed instead. If an executable instruction is located there, then this instruction is executed by the processor. The logic carrying out the method preferably is hard-wired on the processor of a control unit.

According to the conventional art, the overlay memory is used for calibrating the control unit. This can be understood to mean the adaptation of parameters of the completed and tested control unit software to a specific vehicle model. In the case of the flash memories typically used in control units, for physical reasons it is only possible to manipulate individual values with a great deal of time and effort because relatively large memory areas of the flash memory must first be completely erased and then completely reprogrammed in order to do so. Such erasure and continual rewriting of the flash memory generally is not justifiable in terms of time and effort. It generally is not even possible when program processing is running, since a completely erased or only partially reprogrammed flash memory area can result in unforeseen reactions if the processor is processing its program code in this area or is processing data stored there. The parameters are therefore written into the overlay memory so that they overlay the variables stored in the flash memory, where they can be manipulated quickly and at run time. Accordingly, in the conventional art the overlay memory is only used for overwriting variables or parameters.

The method according to the invention now makes provision to introduce a new functionality through the use of the overlay memory, namely to use the overlay memory to insert the code of a bypass routine into a control unit program and to at least partially functionally replace or supplement a program routine with the code.

Accordingly, a bypass routine is written entirely or at least partially into the overlay memory, and the register of the processor used for the overlay functionality is configured through storage of at least one assignment information item such that the bypass routine is executed instead of the original program routine that is to be replaced. One special embodiment makes provision to store in the overlay memory a jump instruction that directs the processor to a memory address outside of the active overlay memory, starting at which address at least a part of the bypass routine is stored. This can basically be any desired address inside or outside the overlay memory. The invention thus can also be used with control units that provide only a very small overlay memory.

According to the invention, "active overlay memory" can be understood to mean the totality of all memory addresses that each have a different memory address assigned one-to-one to them by an item of assignment information so that they each overlay the particular different memory address as explained above.

In contrast to the service-based bypassing known from the conventional art, use of the invention means that preparation of the control unit by the supplier is no longer necessary. In addition, it is possible to reload or replace code of a bypass routine quickly and without stopping the control unit.

To this end, provision can be made, in the event the overlay function is activated, that it is first deactivated so that the control unit continues to run, executing the original program routines. This can be accomplished by erasing the processor register or the assignment information located therein, for example.

During this time, the code of a bypass routine in the overlay memory or a jump instruction in the overlay memory can be manipulated at will, and the overlay functionality can be reactivated when this is finished. In this process, it is necessary to ensure that, at activation of the overlay memory, the processor is not executing instructions in the memory area overlaid by the overlay memory if the overlaying code stored in the overlay memory deviates from the original code.

Conversely, at the time of a deactivation, the program flow must not be located within a part of the bypass routine that deviates from the overlaid original code. Otherwise, the result would be an inconsistency in program flow with unforeseeable consequences up to and including destruction of the test vehicle, simulator, or test stand.

A scenario of this nature is prevented in that the (de) activation of the overlay memory is coupled to a memory address outside of the affected area, for example.

The user then cannot directly initiate a switchover between the two functions, but instead communicates his desire for activation or deactivation, by software running on a connected computer, and the bypass tool used, for example an influencing device connected to the control unit through an interface, carries out this activation/deactivation as soon as the processor reaches a defined memory address recognized as safe, which is to say an address outside the affected area.

For example, this is possible through monitoring of the program counter, by means of which it is possible to read out the memory address of the machine instruction currently being processed. In addition, a variety of other possibilities exist, such as using as a trigger the accessing of a variable that is known to take place at a safe memory address, or the monitoring of an I/O pin.

A preferred, especially safe possibility is the use of a special service function integrated into the program code that initiates the switchover between the original function and the bypass code in response to a signal.

Provision can additionally be made that not only is a bypass routine overlaid over an original program routine by the overlay functionality, but also the deactivation/activation of this overlaying is accomplished through the use of the overlay functionality, e.g. in that an instruction in a program routine outside the program routine to be replaced is overlaid by a jump instruction in the overlay memory, wherein the jump instruction refers to an address starting at which a program code is programmed that reconstructs the overlaid instruction, wherein the program code additionally performs the deactivation/activation of the overlay functionality for the program routine to be replaced, and that ends with a jump instruction referring to the instruction in the program routine outside the program routine to be replaced that follows the overlaid instruction, in particular wherein the deactivation/activation is accomplished by calling a subroutine within this program code.

In this way it is always ensured that a deactivation/activation takes place when the processor is processing program code outside the program routine to be replaced. The program code that takes on the deactivation/activation can write the assignment information that is required for this purpose and that was created by the aforementioned software or the influencing device into the register of the processor provided for this purpose, for example.

In the case of the solution according to the invention that provides for storing only a jump instruction in the active overlay memory, provision can also be made for an activation to take place in a safe manner in that a reconstruction of the entire program routine to be replaced, or of the entire routine portion to be replaced, is stored in the overlay memory before the storage in the overlay memory of the jump command that refers to a memory address outside of the overlay memory starting at which the bypass routine is stored, and an overlay functionality for an overlaying of the entire program routine to be replaced, or of the entire routine portion to be replaced, is activated through this reconstruction.

In this way the effect is achieved that no change in functionality whatever initially results from the activation; namely, the processor processes exactly the same program code after the activation as before the activation. If the said jump instruction is now stored at an address of the active overlay memory, the result is achieved that during the next execution of the program routine the processing by the processor is redirected to the bypass routine outside of the overlay memory. The actual switchover to the bypass routine here thus does not take place through the activation of the overlay functionality, but instead through the storage of the jump instruction at the first address in the assigned overlay memory area, which in turn preferably is performed by the software that runs on the computer connected to the control unit through the said interface The invention can provide for multiple implementations of the storage of the bypass routine while taking into account the safe deactivation/activation of the overlay functionality for the program routine that is to be at least partially replaced.

For example, provision can be made that in the case of a bypass routine with a shorter program code length than the program routine to be replaced or than the program routine portion to be replaced, the entire address range in the read-only memory that is occupied by the program routine to be replaced or by the program routine portion to be replaced is overlaid in the overlay memory by an address range of equal length in which the replacing bypass routine is at least partially stored, preferably in this case is completely stored. In the preferred case, only overlay memory is required for the bypass routine.

In the case of a bypass routine with a longer program code length than the program routine to be replaced or than the program routine portion to be replaced or than the available overlay memory, the entire address range in the read-only memory that is occupied by the program routine to be replaced or by the program routine portion to be replaced can be overlaid in the overlay memory by an address range of equal length in which is stored at least a first portion of the bypass routine ending with a jump instruction that causes the processor to continue processing at an address identified by the jump instruction and starting at which at least an additional portion of the bypass routine is stored. This at least one additional bypass routine portion can then also be stored outside of the overlay memory, for example, such as in the working memory.

These embodiments can additionally provide that in the case of a replacement of an entire program routine by a bypass routine, this bypass routine ends with a jump instruction, in particular with a return instruction that causes the processor to return program processing to the program routine that has called the program routine to be replaced, in particular has called it as a subroutine. Specifically, when a subroutine is called in terms of a "gosub" instruction it is customary for the processor to automatically store a program counter state that reflects the address location of this instruction, and for the processor to return to the next instruction following this address by a "return" instruction as a return statement.

In contrast, if only a portion of a program routine is replaced, then the bypass routine can also end with a jump instruction that causes the processor to proceed with program processing at the instruction of the original program routine that follows the portion to be replaced. In this case, the jump command typically includes an argument that represents an absolute or relative address, which is to say precisely the address to which the processor should jump for further program processing.

One embodiment can also provide that the entire bypass routine is stored in a memory area outside of the active overlay memory and that an instruction at an address of the program routine to be replaced is overlaid in the overlay memory with a jump instruction that causes the processor to continue processing at an address that is identified by the jump instruction and starting at which the bypass routine is stored, which routine ends with a return instruction that causes the processor to return to the particular program routine that has called the program routine to be replaced, in particular has called it as a subroutine, as has already been described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
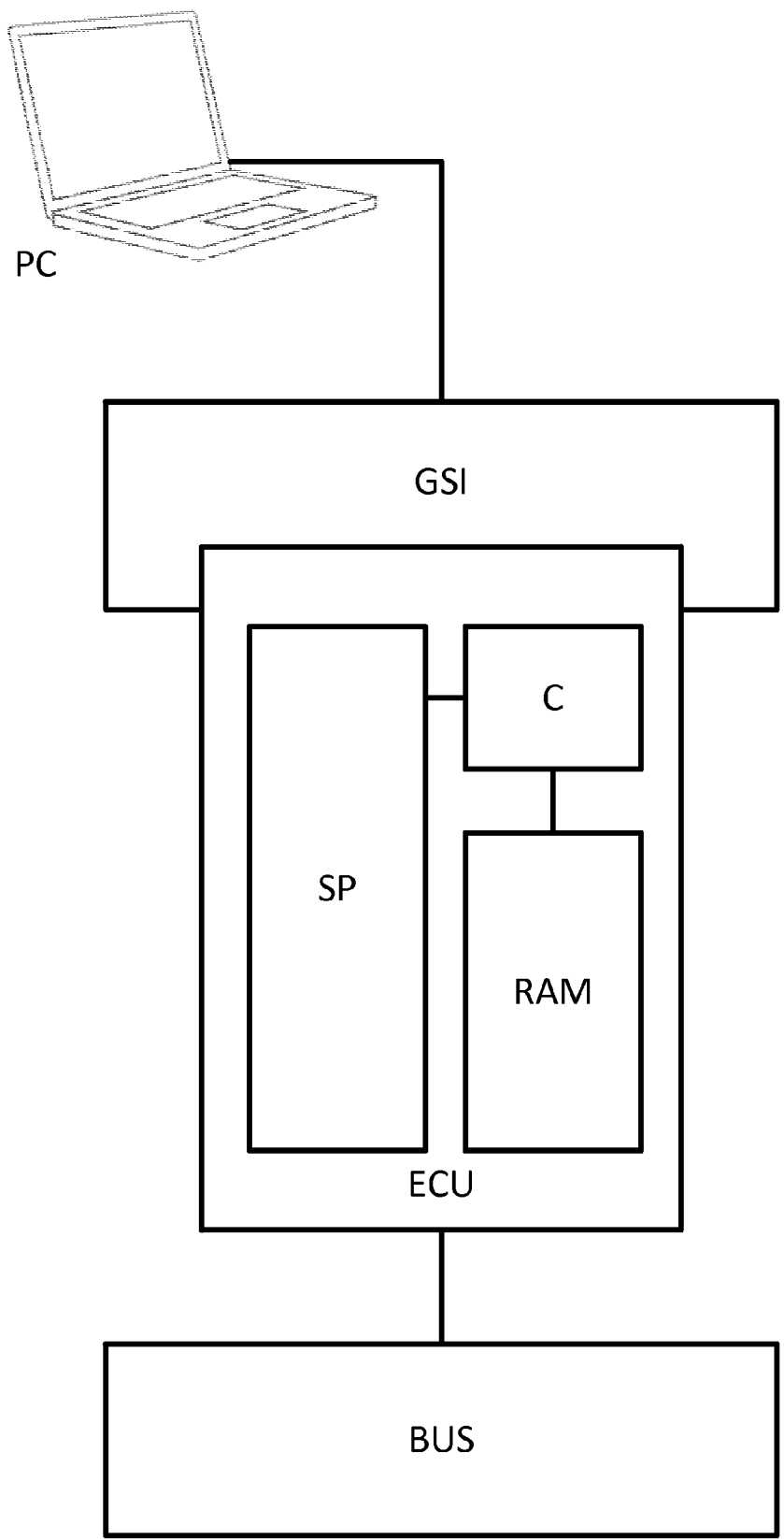
FIG. 1 outlines a technical structure of a bypass scenario.

FIG. 1 outlines a typical bypassing scenario according to the conventional art. An electronic control unit ECU is being tested. This control unit has at least one read-only memory SP, usually a flash memory, a volatile working memory RAM, and a processor C that can access both memories. Located in the read-only memory SP is a computer program coded in machine language that determines the functionality of the control unit. If the control unit is intended for installation in an automobile, for example, the program can be a program for controlling an engine. The control unit also has interfaces. By means of these, it is able to accept data from sensors or other control units and evaluate them by the computer program stored on the read-only memory SP and executed by the processor C as well as to forward data produced by this program to other control units and actuators.

Preferably, ECU is a development control unit not intended to be installed in a completed product in mass production. Accordingly, it has a number of additional interfaces that allow software developers and testers to have access to the control unit beyond the said basic functions. These include, for example, interfaces for direct access to the read-only memory SP and working memory RAM, for configuring the processor C, for reading out the program counter that outputs the memory address presently being processed by the processor C, or for setting and configuring break points and watch points.

In typical scenarios, the control unit ECU is connected to a bus BUS through an interface. The bus BUS can be a network of other control units if the control unit ECU is installed in a test vehicle, for example. However, the bus BUS can also be a network of virtual control units that is simulated on a hardware-in-the-loop (HIL) simulator. Communication with the bus can take place through different bus systems. Generally, the system is the CAN bus that has become established in the automotive industry. However, other standards such as LIN, Ethernet or FlexRay are also possible.

The control unit ECU is also connected to an influencing device GSI. The influencing device GSI, for example a dSPACE DCI-GSI1, is a hardware interface that gives a user access to the said development interfaces. The control unit ECU is connected to a computer PC through the influencing device GSI. Software runs on this computer that is equipped for implementing bypass code and configuring the control unit ECU and that, for example, provides the user with a suitable graphic user interface.

The influencing device GSI is used to operate and monitor the control unit ECU, in particular to configure the processor registers and read out the program counter. The connected computer PC has no direct access to the control unit ECU. Requests for changes initiated by the user, such as the activation or deactivation of the overlay functionality, are communicated by the computer to the influencing device GSI, which then performs the corresponding reconfiguration of the control unit ECU on its own.

The structure shown in FIG. 1 is exemplary in nature and does not limit the method according to the invention. Accordingly, the functionality of the influencing device GSI can be delegated wholly or in part to the processor C of the control unit in the form of service functions, for example. In particular, when the control unit ECU has more than one processor (multi-core), a first processor can process all program routines that are part of the functionality of the control unit provided by the supplier, while a second processor processes the service functions that belong to the bypass environment and were installed at a later time in parallel—without slowing down the first processor in so doing.

Depending on the application, it may also be possible to do without the connected computer PC, once all bypass routines have been loaded and the control unit ECU has been prepared in accordance with the invention. For example, if the influencing device GSI or a responsible service function are designed such that the desire for an activation or deactivation of the overlay functionality is communicated by the voltage state of an I/O pin of the control unit or of the influencing device GSI, then a switchover between the original code and a bypass routine can also take place using a connected electrical switch.

According to the invention, the "bypass environment" refers to the totality of the components from FIG. 1 that extend beyond the basic functionality of the control unit ECU (execution of control unit code, communication with the bus BUS), which is to say the influencing device GSI, the computer PC, the configuration and bypass software, and the interfaces through which said software communicates with the control unit.

Figure 2:
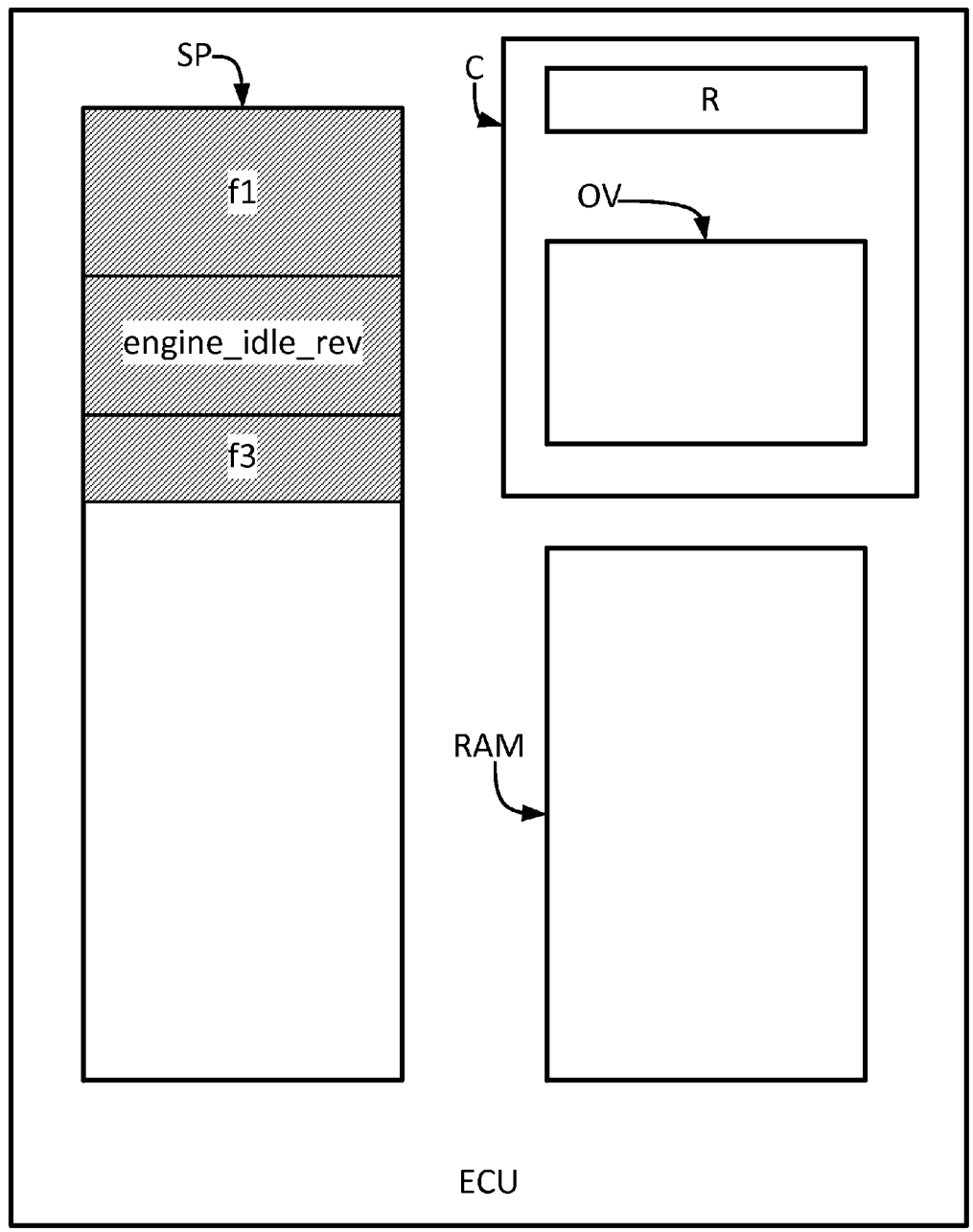
FIG. 2 shows a development control unit before use of the method according to the invention.

FIG. 2 schematically shows a development control unit ECU with a processor C, a read-only memory SP which normally is a flash memory, and a working memory RAM. Integrated into the processor C are an overlay memory OV and a set of registers R. The processor C contains an arrangement of logic gates that are designed such that memory address ranges in the read-only memory SP and working memory RAM can be defined by the register R, the contents of which ranges are ignored by the processor C and replaced by contents from the overlay memory OV in processing the program.

At every memory access, the processor checks whether the address of the machine instruction currently being read lies within a range covered by the register R. If this is the case, the content stored there is ignored, and the content at the assigned memory address of the overlay memory OV is accessed and executed instead. In this way, individual contents/instructions or even relatively long sequences can be temporarily deactivated and replaced by other contents/instruction sequences without the need to overwrite the original sequences in the read-only memory SP.

The configuration shown in the figure is exemplary in nature and does not limit the method according to the invention. Other embodiments are possible. For example, the overlay memory OV could also be an address range of the working memory RAM or other addressable memory areas of the processor C reserved for this purpose. In addition, both working memory RAM and read-only memory SP can be integrated into the processor C. Which specific memory areas can be overlaid by the overlay memory OV can also vary by control unit or the processor used. For one unit it may perhaps be all memory areas addressable by the processor, including read-only memory, RAM and external storage media, for another it may be only parts of the addressable memory.

Located in the read-only memory SP is a program coded in machine language, comprising three program functions f1, engine_idle_rev and f3. (The number three serves to facilitate graphical representation. An actual control unit program typically has several hundred functions.)

In one realistic exemplary scenario, the control unit ECU is an engine control unit and the function engine_idle_rev is a function for controlling the idle speed. To reduce fuel consumption, it is useful to keep the idle speed of the engine as low as possible, which is to say close to the speed that is just sufficient to maintain the operation of the engine. However, this value is not a constant defined for every engine model, but instead is a variable value determined by many changeable factors. In addition to the engine model these include the state of charge of the battery, the instantaneous engine load due to electrical loads, or the engine temperature, for example. In accordance with the many hard-to-quantify influencing factors, there is great potential for optimization. No programmer of a function for controlling the idle speed can rule out with certainty the existence of a better solution. In one scenario an automobile manufacturer who has received a fully programmed development engine control unit may want to replace the function for controlling the idle speed that is implemented on this control unit with another for test purposes.

In another scenario, he may want to extend the functionality of the control unit. For example, he may want to equip his automobile model with an automatic shutoff feature for when the vehicle is stopped. Since the function for controlling the idle speed that is present on this control unit does not have such functionality, he wishes to replace it with his own function, and test multiple variants of his own function for this purpose.

The source code generally is not available to the user. In the conventional art, he would have to read the hex code from the memory SP, provide it with bypass services, insert the bypass code, and rewrite the flash memory. Replacing the bypass function with a third variant of the function would in turn require another rewriting of the flash memory, etc. This is very time-consuming.

Figure 3:
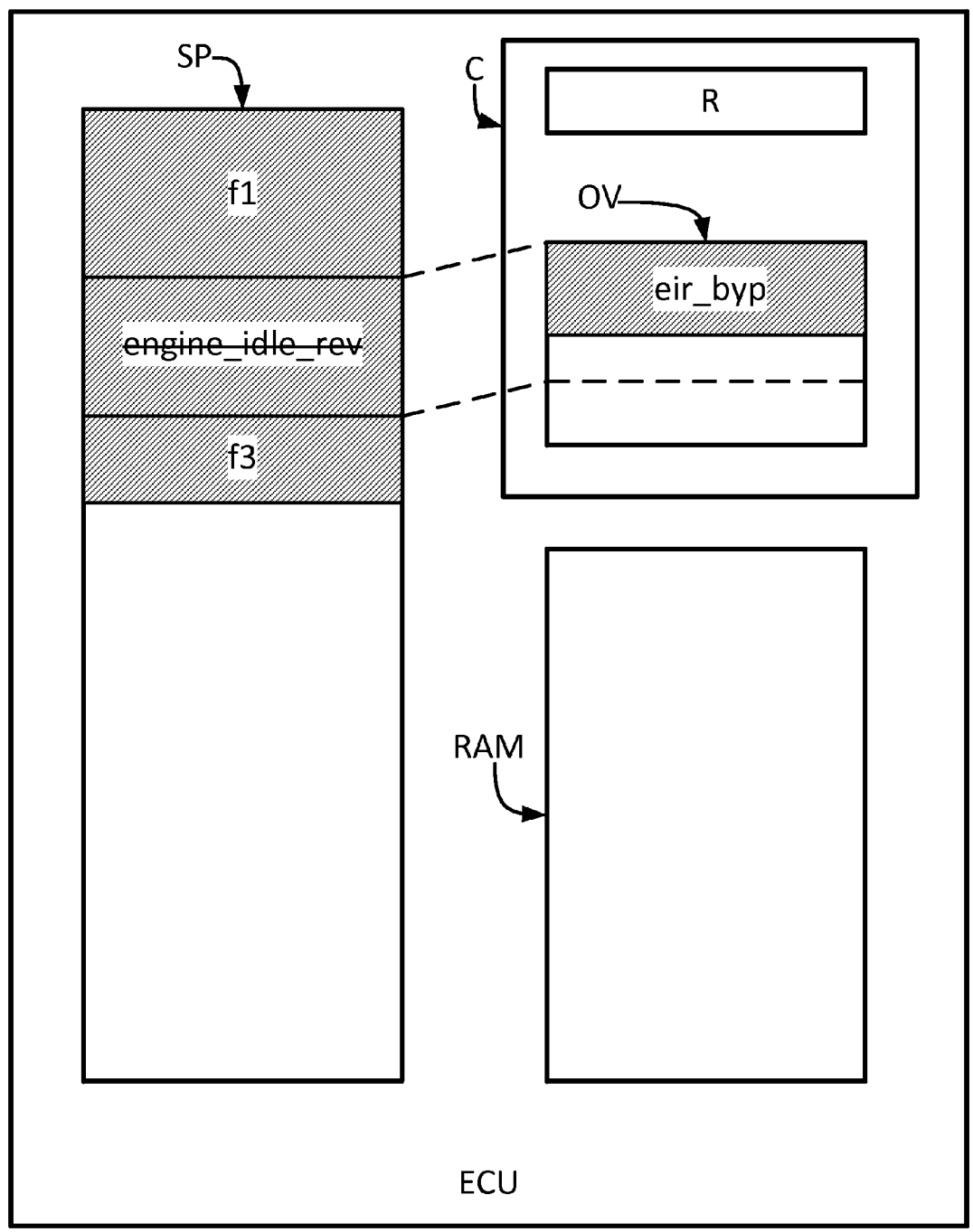
FIG. 3 shows a development control unit after use of the method according to the invention, wherein the bypass function is smaller than the original function.

The method according to the invention makes it possible to replace the function engine_idle_rev without special preparation of the control unit ECU and without modifying the code stored on the flash memory SR FIG. 3 shows the control unit after use of the method. The registers R are configured such that an address range of the overlay memory OV overlays the function engine_idle_rev to be replaced. Located in this address range is a bypass function eir_byp stored by the user, which is now called by the processor in place of the original function.

When the overlay function is activated, each address in the overlay memory is assigned to one address in the read-only memory (or in the working memory). The overlaid memory and assigned overlay memory are therefore always of the same size. As long as the bypass code fits into the assigned overlay memory and has a complete function, this does not cause any problems. The bypass function closes with a return instruction that returns the processor to the calling parent function and the program proceeds normally. In contrast, if the bypass function is longer than the original function, it cannot be fully integrated into the overlay memory.

Figure 4:
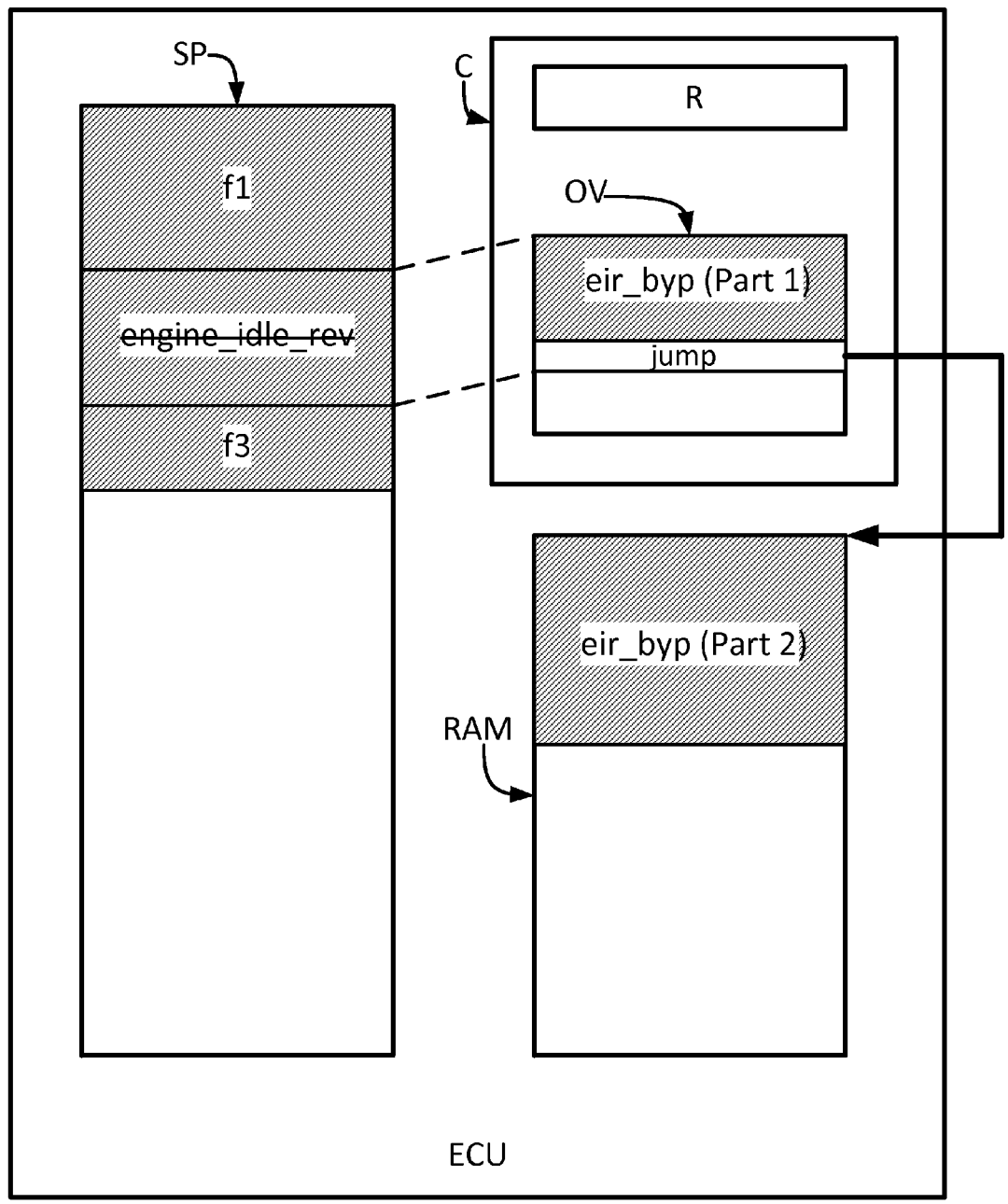
FIG. 4 shows a development control unit after use of the method according to the invention, wherein the bypass function is larger than the original function.

One possible method of proceeding in this case is shown in FIG. 4. The assigned overlay memory in this case is too small to completely accommodate the bypass function. At least a portion of it must therefore be relocated into the working memory. Jump instructions provide for a consistent program execution. It is also possible to relocate the functional bypass code completely into a memory area not provided as overlay memory, for example into the working memory RAM, and to write into the active overlay memory only a jump instruction that refers to the functional bypass code.

Figure 5:
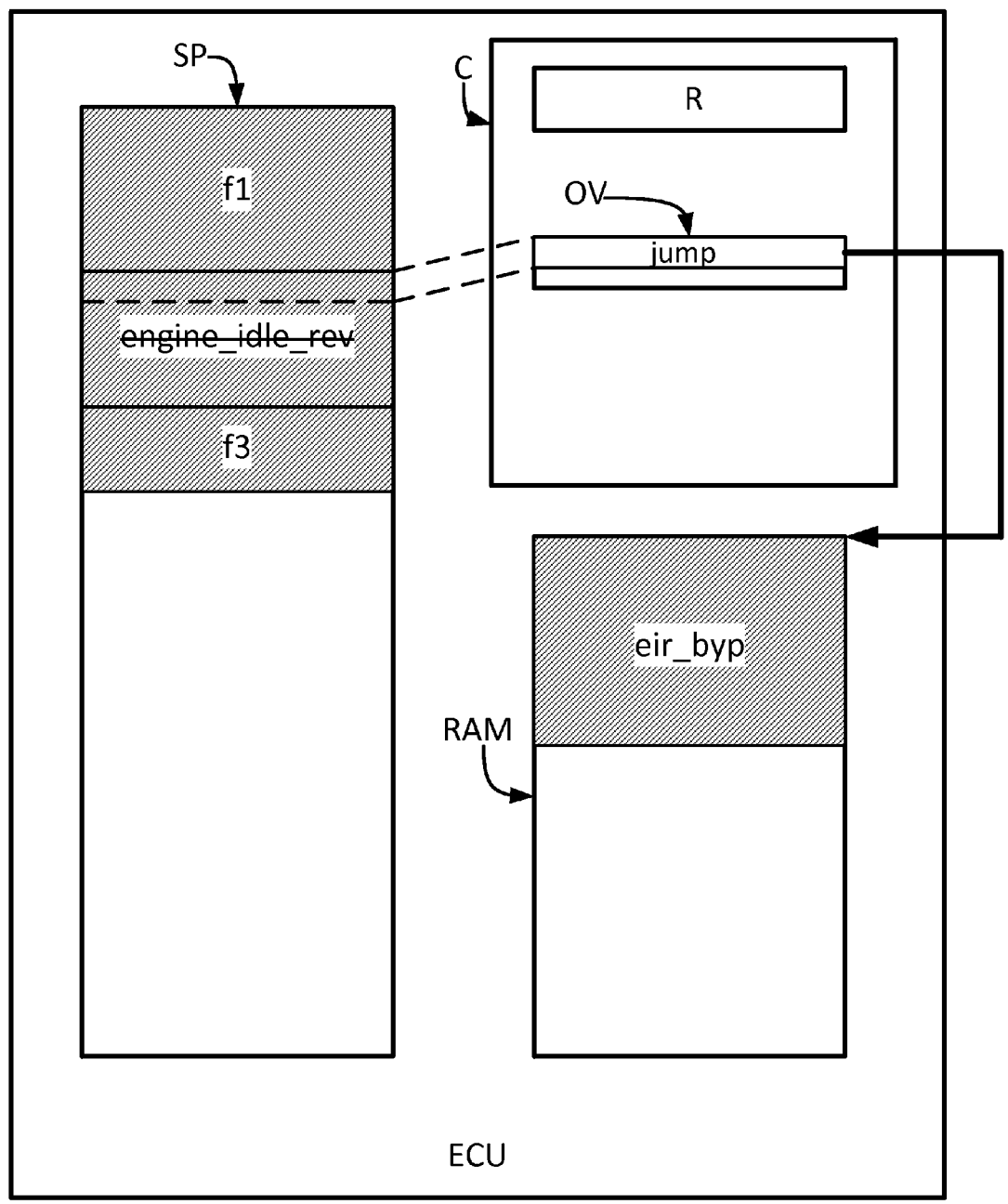
FIG. 5 shows an implementation of the method according to the invention that works with a small amount of overlay memory resources.

In some development control units, the overlay memory may be intended only for overlaying a small number of instructions, and may be too small for storing relatively long code sequences. Or else, it may not be technically possible to divide the function eir_byp, for example due to limitations of the compiler used to translate the function. FIG. 5 shows the procedure in this case. The complete original function is not overlaid, but instead only a short sequence, preferably at its beginning or at another suitable location. The assigned memory area in the overlay memory contains only a jump instruction to the bypass function relocated into the working memory RAM.

In practice, the overlay memory cannot always be allocated as freely as was implicitly presupposed by the examples presented. Many development control units are subject to limitations in this regard, for example in that the size in bytes of a contiguous overlay memory area must be a power of two, or that the allocatable memory area is divided into indivisible intervals of several bytes. In using the method according to the invention, this means that the allocated overlay memory generally must be a choice of either larger or smaller than is actually desired. This circumstance is not limiting for the applicability of the invention. In the case of allocated overlay memory that is too small, the method shown in FIG. 4 or FIG. 5 can be used. In the case of allocated overlay memory that is too large, all memory addresses of the allocated overlay memory that overlay a memory address outside the memory area provided in accordance with the invention for an overlay are filled in each case with an exact copy of the content of the overlaid memory address, so that it makes no difference whether the processor C executes the original code or the code stored in the allocated overlay memory at this point, because the two are identical. Within the scope of the invention, it is unimportant whether the overlay memory is allocated in the right size from the start, or whether a part of the overlay memory is initially allocated in an undesired manner and then effectively deactivated again in the manner described.

All the examples that have been considered thus far presuppose that the bypass code has a complete function. Since control unit code is made up of software components, this will also usually be the case in practice. Software components are functions that have already been compiled or packages of a few functions with documented functionality and documented interfaces, which are combined into programs, frequently using the principles of graphical programming (using dSPACE SystemDesk, for example). As long as the interfaces and the basic functionality of a component are known—suitable documentation accompanies each component—it is not necessary to know the component's code. This mode of operation is established practice in control unit programming. This is the reason that the assumption is generally made that the bypass code also includes components, which is to say has at least one complete function. However, in principle nothing stands in the way of providing just a relatively short code sequence, rather than a complete function or software component, with a bypass by the method described in the instant patent application.

Figure 6:
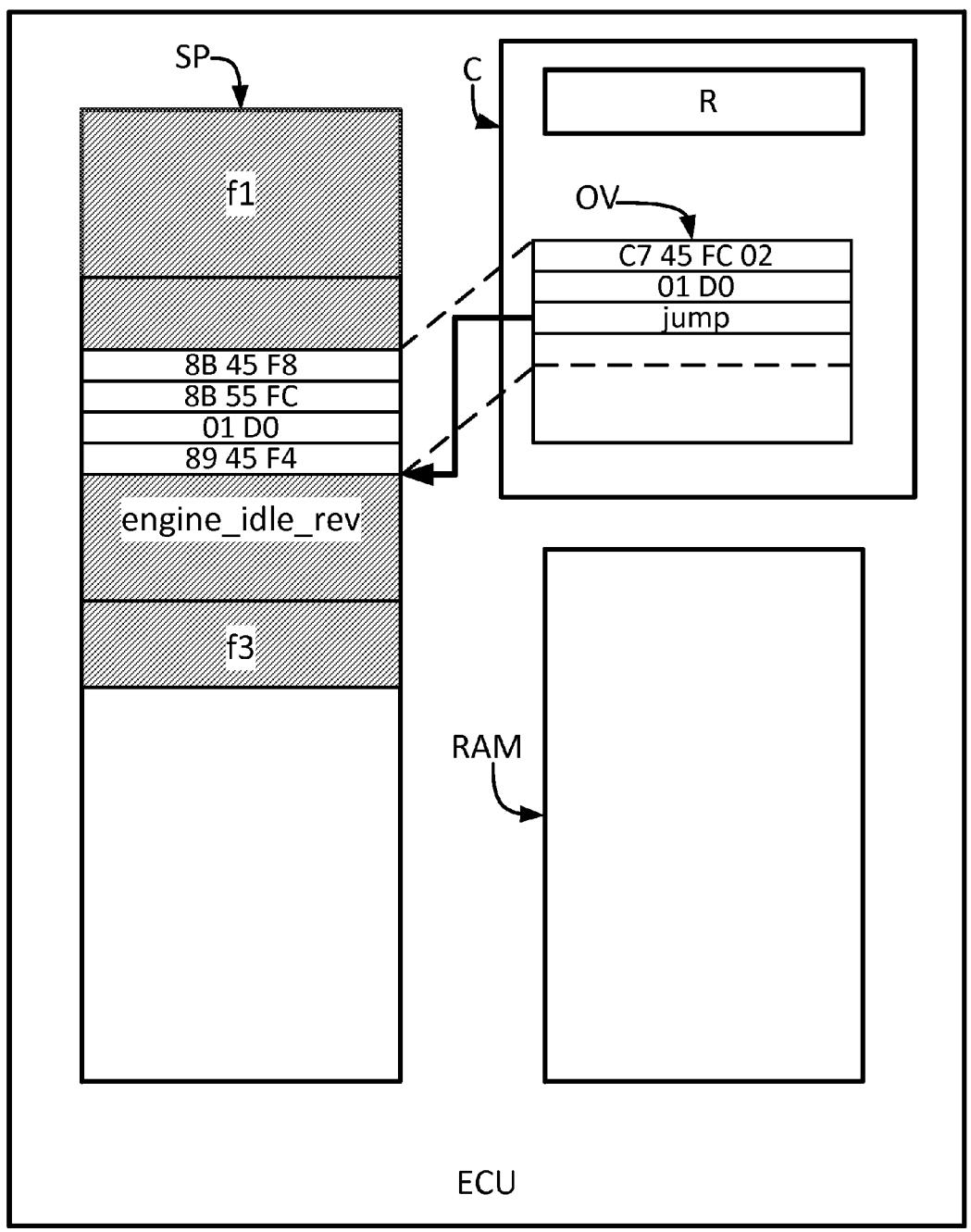
FIG. 6 shows an implementation of the method according to the invention in which the bypass code does not represent a complete function.

FIG. 6 shows the execution of one such bypass. The registers R are configured such that the overlay memory OV overlays a sequence of machine instructions within the function engine_idle_rev, for example in order to replace a part of the functionality of the function engine_idle_rev, such as the calculation of a certain value or the writing of dedicated variables. Since the bypass code accordingly also does not describe a complete function, the closing return instruction is missing. Consequently, the bypass code must be supplemented by a closing jump statement that directs the processor C back to the regular program sequence. In the diagram, the bypass code is smaller than the overlaid original code. But because the reserved overlay memory is always exactly the same size as the overlaid memory, a part of the reserved overlay memory remains unwritten. Without the jump statement, undefined behavior would occur once the processor C reaches the first unwritten address.

Alternatively, it is possible to fill the reserved but unused overlay memory with blank instructions (NOPs=No OPeration) or with other instructions that are not critical to the functional flow. However, since processing them generally takes longer than execution of the original code (program code contains if statements, and thus is executed selectively), the method shown in FIG. 5 with the jump statement is preferred in general.

If the bypass code sequence is bigger than the original code sequence, a portion of the code is relocated into the working memory RAM or another available memory as shown in FIG. 4. Yet the bypass code must be extended by a closing jump statement in this case as well.

With all methods presented, it is necessary to ensure that no code that is affected by the overlaying by the overlay memory and that differs from the overlaid or overlaying code is being executed at the time of an activation or deactivation of the overlay memory. For the example illustrated in FIG. 3, this means that the overlay memory can only be activated when no code from the function engine_idle_rev is currently being executed. Conversely, its deactivation can only be permitted when no code from eir_byp is being executed.

Otherwise, while in the middle of processing the code of one function, the processor would jump to the other function, which is to say it would effectively execute a new and very probably meaningless function composed of part of the code of each of the two functions. Or, if it has already left the memory area overlaid by eir_byp, it would jump into the unwritten area of the reserved overlay memory. It would even be possible for the change to take place in the middle of an instruction, combining parts of the original code and the bypass code into a new and likewise very probably meaningless instruction. In almost every case, the consequence would be an unpredictable malfunction of the control unit with potentially grave consequences.

To this end, the bypass environment is designed such that the user communicates the desire for an activation or deactivation of a bypass routine to the bypass environment.

This activation/deactivation is performed at a time when the processor is processing a memory address recognized as safe. This can be ensured through monitoring of the program counter, for example, which reflects the memory address currently being processed by the processor, and analysis of additional units of information, such as, e.g., dedicated registers or call stacks, which contain the return addresses of program routines interrupted by interrupts. This information can be actively read through, e.g., a debug interface (for example, a JTAG debug interface), or can be passively monitored through a program trace interface, through which the processor outputs the memory address of the instruction currently being executed.

Another possibility in addition to reading out the program counter is to couple the (de)activation of the overlay memory to a trigger event for which it is known that it only occurs at memory addresses known to be safe. For example, this could be access to a certain variable or the driving of a certain I/O pin. The duration of a reconfiguration of the register for (de)activation of the overlay memory is significantly shorter than a typical program cycle of a control unit. A switchover between bypass code and original code is thus possible without stopping the control unit. For this purpose, however, the processor must be currently processing an address that guarantees a sufficient time period before the function affected by the overlay.

Thus, a long enough time period must pass from the start of the activation or deactivation of the overlay functionality until the next call of the function that the activation or deactivation through reconfiguration of the register R is sure to be completed by then. This method therefore requires a prior analysis of the binary code in order to find all calls of the function in question and to identify the memory addresses that permit a safe activation or deactivation of the overlay functionality. Alternatively, the control unit can be stopped until the conclusion of the switchover once the processor is processing code that is not affected by the (de)activation of the overlay memory. However, stopping of a processor is undesirable in general, because the entire system (simulator, test stand, or test vehicle) usually must also be stopped for the purpose. For example, as a general rule an engine control unit must not be stopped while the engine is still running.

An especially safe, and therefore preferred, method is the activation or deactivation of the overlay functionality by a service function, which itself is preferably integrated into the program code by utilizing the overlay memory, without changing the original code in doing so.

Figure 7:
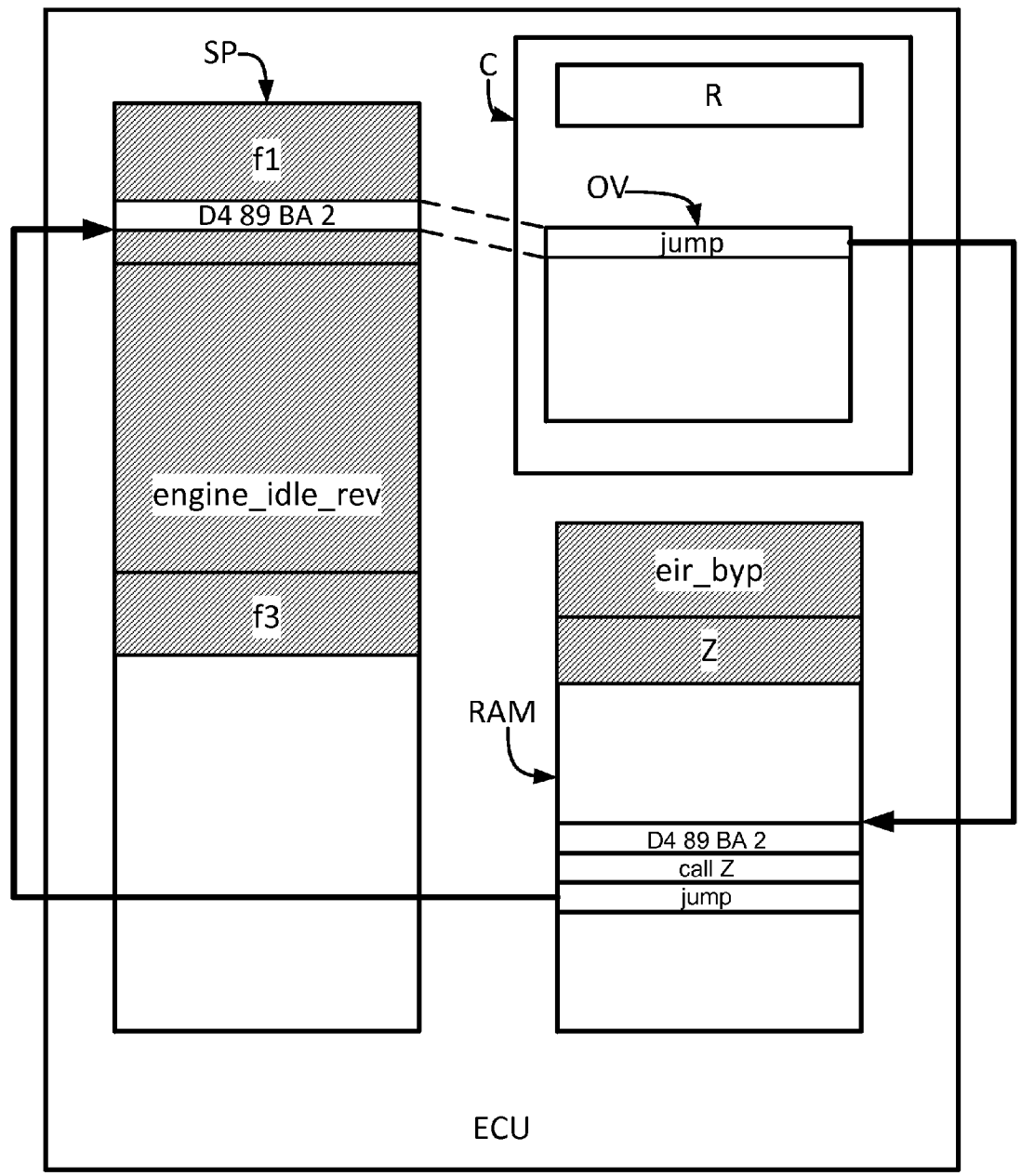
FIG. 7 shows, by way of example, the integration of a service function into the control unit code using the method according to the invention.

FIG. 7 shows how such a service integration operates. Located in the working memory RAM or another available memory in addition to the actual bypass function eir_byp is a service function Z, which can be integrated into the program code at any desired point, in particular outside of the routine to be replaced through overlaying, by utilizing the overlay memory OV. The diagram shows an integration into the function f1. Through overlaying, a short code sequence is replaced by a jump statement that points to an address in the working memory RAM. There, the overlaid code is first reconstructed and supplemented by a call of the service Z. An additional jump statement follows that brings the processor C back to the regular program sequence. The service function contains an instruction for reconfiguration of the processor register R that is tied to a condition, for example to a control variable whose value can be modified by an interface or the signal level of an input pin of the control unit ECU. In this embodiment of the invention, the user does not have to worry about what point in time the registers R are reconfigured. This is certain to occur within the integrated service function that is not part of the actual program code. By implication, it is certain that no function that is part of the program and no bypass function will be executed at this point in time. In order to prevent interrupt processing in the processor from interrupting the service function or the sequences of the service function that are critical for the reconfiguration of the overlay areas, the service code can ensure that such an interruption in these critical sequences cannot occur.

The activation of the overlay functionality for incorporating the service function Z takes place before the start of processing by the processor C of the program code to be changed by interfaces of the control unit ECU provided for this purpose, for example immediately after the control unit ECU is switched on, or during the initialization phase of the control unit program. In another embodiment, the service function Z shown in FIG. 7 can also be a classic service function that calls a bypass function that preferably is stored in the working memory RAM. In one embodiment, the bypass function would first write its values into a buffer. The original function would then execute entirely normally, and after its execution an overwrite function that overwrites the values written by the original function with the values from the buffer would be called with a second service call.

If the control unit ECU has more than just one processor core, it can be advantageous for the original function engine_idle_rev and the bypass function eir_byp to be computed in parallel on two processor cores. This means that a first processor core processes the control unit program, including the original function engine_idle_rev, stored on the flash memory SP while a second processor core processes the bypass function eir_byp in parallel once the bypass function has been called. In this way, increases in the runtime that occur due to the integration of an additional function, impairing real-time capability of the control unit ECU, are minimized. Especially in time-critical tasks such as the control of an engine, this embodiment is considered advantageous.

Figure 8:
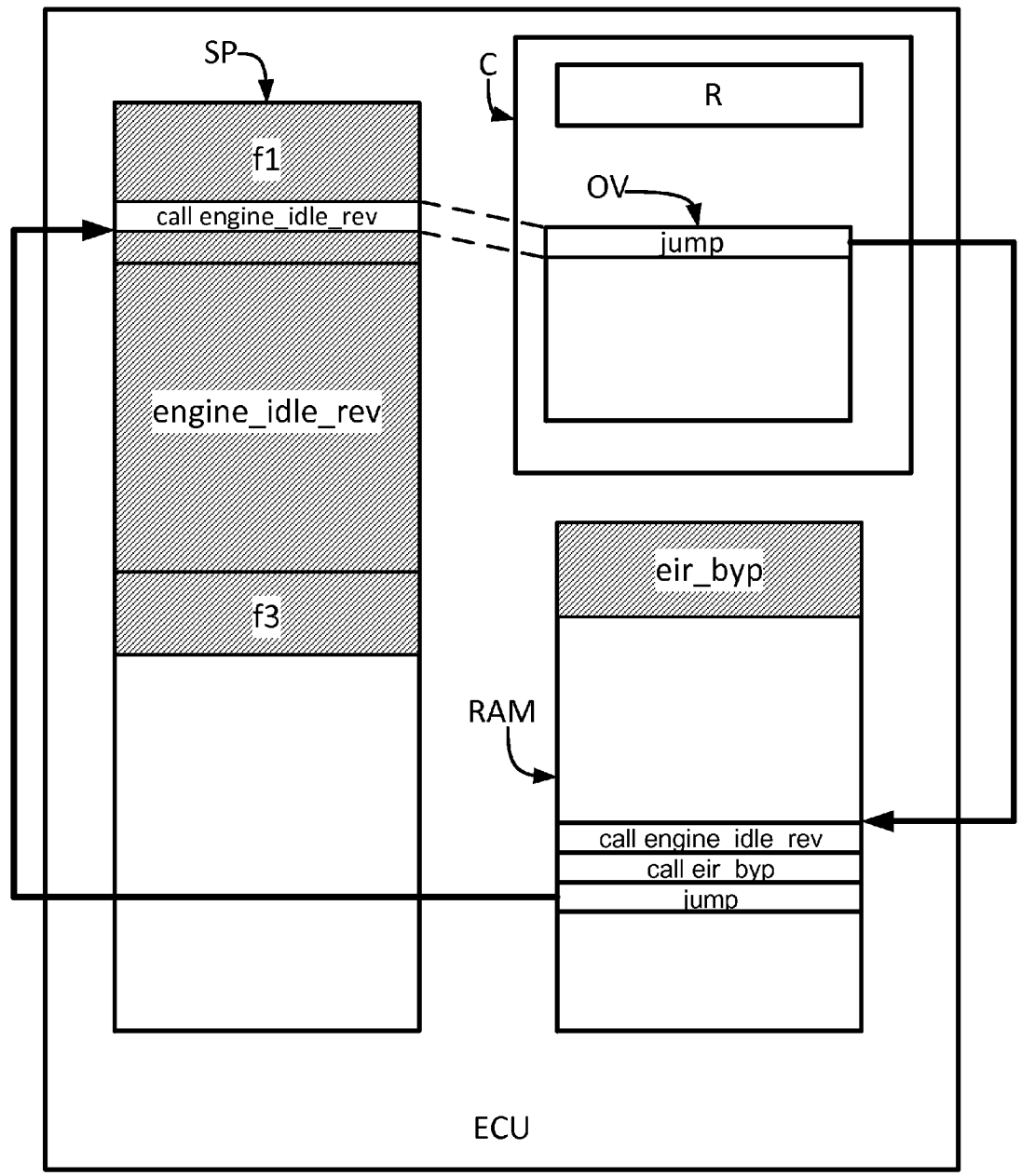
FIG. 8 shows a supplementary integration of a function call into the control unit code using the method according to the invention.

FIG. 8 shows another preferred exemplary embodiment of the method according to the invention. According to the method presented in FIG. 7 the call to the original program function engine_idle_rev occurring from the function f1 is supplemented by a call to the bypass function eir_byp. In this way, both functions are processed by the processor C, first the original function and afterwards the bypass function, wherein the output values of only one of the two functions are used for further processing of the control unit program. In this way it is possible to compare the two functions, the function engine_idle_rev originally installed on the control unit ECU and the bypass function eir_byp provided to replace it, directly with one another or to make the output values of engine_idle_rev available to the bypass function eir_byp for processing or validation. It can be part of the functional scope of eir_byp to decide whether its own output values or the output values of the original program function are used in the further course of program processing. For example, as a function of the value of a parameter that can be manipulated by the user, eir_byp can store its own output values for later analysis without making them available to subsequent program routines, or can overwrite the output values written by engine_idle_rev. It can also be part of the functional scope of eir_byp to store the output values written by engine_idle_rev for later analysis.

A variant of the invention can also provide that a one-to-one-copy of the original function is first written into the overlay memory OV. The first instruction of the function stored in the overlay memory is then replaced by a return, and the overlay memory is subsequently activated. This deactivates the function to be replaced. Once it has been ensured that no program code in the overlay memory is being executed, for example by monitoring the program counter or even simply by waiting a short time, the function stored in the overlay memory is replaced with bypass code, with the return instruction not being overwritten until the very last. This variant can only be carried out if the function to be replaced can simply be deactivated without dangerously impairing the function of the control unit. Frequently this is the case.

Another variant can provide that a one-to-one-copy of the original function is written into the overlay memory OV. The bypass function is first written into an available memory area not intended as overlay memory, preferably in the working memory RAM. In a second step, the first instruction of the code in the overlay memory is overwritten with a jump statement to the bypass function. It is now possible to switch between the original code and the bypass code without further safety measures, since the two codes are identical except for the jump statement.

This variant can only be carried out safely if jump statements can be formulated as atomic instructions and an atomic instruction is likewise present at the position in the original program code that is to be overlaid, so switchover "in the middle" of an instruction is not possible. Frequently this is the case.

In one embodiment of the invention, provision can be made to create an overlay memory by reprogramming a memory management unit (MMU), which many development control units possess. Logical memory addresses can be assigned to physical memory addresses by the MMU. According to the invention, it is thus possible to write bypass code into a free physical memory area and then reprogram the MMU such that the logical memory addresses assigned to the code to be replaced point to the bypass code after the reprogramming of the MMU.

With the MMU it is thus possible to overlay memory areas, in particular as is done with the overlay units, namely in that two different assignments of logical memory addresses are used so that one and the same set of logical memory addresses points either to the code to be replaced or to the bypass code.

All methods described in this document are applicable regardless of whether an overlay memory is present in native form or is produced by programming an MMU. If an MMU with sufficient functionality is available, it is immaterial to the invention whether assignment information is written to a register of the processor with an overlay function or to an MMU in order to activate the overlay functionality. Sufficient functionality should be understood to mean, in particular, that the configuration of the MMU can be changed during ongoing operation of the control unit.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for changing a software in the memory of an electronic control unit, wherein the memory includes at least one read-only memory with multiple original program routines stored therein that constitute at least a portion of the software and that are processed by at least one processor of the control unit, the memory has at least one working memory for storing volatile data, and the memory also has an overlay memory, the method comprising:
    assigning each memory address from the overlay memory to a memory address in the read-only memory by an assignment information item, with the result that, when an overlay functionality is activated, instead of processing a program routine instruction at an address in the read-only memory, the processor processes the instruction at an assigned address of the overlay memory;
    storing, during a run time of the control unit, at least a functional part of a bypass routine that is to at least partially replace an original program routine in an address range in the overlay memory, or storing a jump instruction in the overlay memory as the first part of a bypass routine that refers directly or indirectly to a second part of the bypass routine that is stored in an address range accessible to the processor; and
    creating an assignment information item, in order to activate an overlay functionality, that assigns the address and/or the address range of the overlay memory to an address or address range of the program routine to be replaced or the portion of the program routine to be replaced and this assignment information item is activated or deactivated through an interface of the control unit,
    wherein an activation of the overlay functionality takes place at a time when machine code to be replaced by the activation of the overlay functionality is not being executed by the processor of the control unit.

2. The method according to claim 1, wherein an entire address range in the read-only memory that is occupied by the program routine to be replaced or program routine portion to be replaced is overlaid by the overlay memory with an address range of equal length in which the replacing bypass routine is at least partially stored.

3. The method according to claim 1, wherein in the case of a bypass routine with a longer program code length than the program routine to be replaced or than the program routine portion to be replaced, the entire address range in the read-only memory that is occupied by the program routine to be replaced or by the program routine portion to be replaced is overlaid in the overlay memory by an address range of equal length in which is stored a first portion of the bypass routine ending with a jump instruction that causes the processor to continue processing at an address identified by the jump instruction and starting at which at least an additional portion of the bypass routine is stored.

4. The method according to claim 2, wherein, in the case of replacement of an entire program routine, the bypass routine ends with a return instruction that causes the processor to return program processing to the program routine that has called the program routine to be replaced, or has called it as a subroutine, or in the case of replacement of only a portion of a program routine, the bypass routine ends with a jump instruction that causes the processor to proceed with program processing at the instruction of the original program routine that follows the portion to be replaced.

5. The method according to claim 1, wherein the entire functional code of a bypass routine is stored in a memory area outside of the active overlay memory and an instruction or data item at an address of the program routine to be replaced is overlaid by the overlay memory with a jump instruction that causes the processor to continue processing at the address identified by the jump instruction and starting at which is stored the functional code of the bypass routine, which routine ends with a return instruction that causes the processor to return to the particular program routine that has called the program routine to be replaced, in particular has called it as a subroutine.

6. The method according to claim 1, wherein the functional code of the bypass routine is stored in a memory area outside of the active overlay memory and an instruction at an address of the program routine to be replaced in the overlay memory is overlaid with a jump instruction that causes the processor to continue processing at an address identified by the jump instruction, wherein the jump instruction refers to an address starting at which a program code further performs calling of the functional code of the bypass routine, in particular wherein the calling of the functional code of the bypass routine takes place within a subroutine called within this program code.

7. The method according to claim 1, wherein a logic unit performing the activation, which runs on the influencing device connected through the interface, monitors the program processing position of the processor of the control unit by the program counter, and wherein the activation takes place at a time when the program processing position points to an address outside the program routine to be replaced.

8. The method according to claim 1, wherein a logic unit performing the activation, which runs on the influencing device connected through the interface, monitors a trigger/interrupt that is set by program code located outside the program routine to be replaced, and the activation takes place when a change in the trigger/interrupt is detected.

9. The method according to claim 8, wherein the trigger is implemented by the accessing of a variable or a state change of an I/O pin.

10. The method according to claim 1, wherein the activation is carried out by a subroutine called by a processor of the control unit.

11. The method according to claim 1, wherein an instruction in a program routine outside the program routine to be replaced or outside the portion of the program routine to be replaced is overlaid by a jump instruction in the overlay memory, wherein the jump instruction refers to an address starting at which a program code is programmed that reconstructs the overlaid instruction, that additionally performs the deactivation/activation of the overlay functionality for the program routine to be replaced, and that ends with a jump instruction that refers to the instruction in the program routine outside the program routine to be replaced that follows the overlaid instruction, and wherein the activation is accomplished by calling a subroutine within this program code.

12. The method according to claim 1, wherein the code stored in the active overlay memory exactly reconstructs a part of the code stored in the corresponding assigned memory addresses of the read-only memory.

13. The method according to claim 1, wherein the creation of the assignment information item and the activation of the overlay functionality take place by an influencing device connected to an interface of the control unit or a computer connected to an interface of the control unit.

14. The method according to claim 1, wherein the creation of the assignment information item and/or the activation of the overlay functionality take place by a program routine executed by a processor of the control unit.

15. The method according to claim 14, wherein the control unit has at least two processor cores, wherein the program routine for creation of the assignment information and/or the activation of the overlay functionality is processed by a first processor core and the original program routines are processed by a second processor core or by multiple additional processor cores.

16. The method according to claim 1, wherein the bypass routine contains a complete function ending with a return instruction.

17. The method according to claim 1, wherein the bypass routine or a part of a bypass routine is stored in a memory area addressable by the processor through an interface of the control unit during the run time of the control unit.

18. The method according to claim 1, wherein at least one instruction in a program routine is overlaid by a jump instruction in the overlay memory, and wherein the jump instruction refers to an address starting at which a program code is programmed that reconstructs the overlaid instruction, that additionally calls a functional bypass routine, and that ends with a jump instruction that refers to the instruction in the program routine that follows the overlaid instruction.

19. The method according to claim 18, wherein the control unit has at least two processor cores and at least the functional code of the bypass routine is processed by one or more first processor cores and the original program routines are processed by one or more second processor cores.

20. The method according to claim 1, wherein an overlay memory on a control unit is created by programming a memory management unit of the control unit such that the logical memory addresses that are assigned to the program routine to be replaced or program routine portion to be replaced when the overlay functionality is deactivated are assigned, when the overlay functionality is activated, to physical memory addresses that in their totality contain at least a part of the bypass routine.

* * * * *